(12) United States Patent
Kim et al.

(10) Patent No.: US 9,352,232 B2
(45) Date of Patent: May 31, 2016

(54) METHOD FOR PROVIDING CHARACTER OF ONLINE GAME AND APPARATUS THEREOF

(71) Applicant: Intellectual Discovery Co., Ltd., Seoul (KR)

(72) Inventors: Jeong Hun Kim, Seoul (KR); Ki Cheol Jang, Gyeonggi-do (KR)

(73) Assignee: INTELLECTUAL DISCOVERY CO., LTD., Seoul (KR)

( * ) Notice: Subject to any disclaimer, the term of this patent is extended or adjusted under 35 U.S.C. 154(b) by 112 days.

(21) Appl. No.: 14/369,582

(22) PCT Filed: Nov. 26, 2012

(86) PCT No.: PCT/KR2012/010002
§ 371 (c)(1),
(2) Date: Jun. 27, 2014

(87) PCT Pub. No.: WO2013/100378
PCT Pub. Date: Jul. 4, 2013

(65) Prior Publication Data
US 2014/0364220 A1 Dec. 11, 2014

(30) Foreign Application Priority Data
Dec. 28, 2011 (KR) .......................... 10-2011-0145279

(51) Int. Cl.
*A63F 9/24* (2006.01)
*A63F 13/58* (2014.01)
(Continued)

(52) U.S. Cl.
CPC .................. *A63F 13/58* (2014.09); *A63F 13/69* (2014.09); *A63F 13/828* (2014.09); *A63F 13/30* (2014.09)

(58) Field of Classification Search
CPC ....... A63F 13/80; A63F 13/828; A63F 13/58; A63F 13/69
See application file for complete search history.

(56) References Cited

U.S. PATENT DOCUMENTS 6,648,760 B1 * 11/2003 Nicastro ................ G09B 9/052
434/353
7,618,312 B1 * 11/2009 Kasten .................... A63F 13/12
463/7

(Continued)

FOREIGN PATENT DOCUMENTS

JP   2006087496 A   4/2006
JP   2011015857     1/2011

(Continued)

OTHER PUBLICATIONS

International Search Report PCT/KR2012/010002, dated Jan. 28, 2013, 13 pages.

*Primary Examiner* — James S McClellan
*Assistant Examiner* — Kevin Carter
(74) *Attorney, Agent, or Firm* — Sughrue Mion, PLLC

(57) ABSTRACT

The present invention provides a technique for preferring a season character by users by increasing a skill capability value of the season character in which a limitation capability value of a character is differentiated according to a time provided in a game compared with a general character in an online game managing the character. A method for providing a character of an online game according to an exemplary embodiment of the present invention through a character providing apparatus includes: obtaining information for at least one season character selected among a plurality of general characters pre-provided in a game according to a season character selection reference and differentiated with a limitation capability value as an upper limit value of a skill capability value according to a selected period; setting a skill capability value adjustment rule to adjust a skill capability value among each piece of information for at least one season character; adjusting the skill capability value of the season character to be higher than the general character corresponding to the skill character according to the skill capability value adjustment rule; setting a limitation capability value adjustment margin for the season character; setting the limitation capability value adjustment reference; and setting a limitation capability value of the season character according to the limitation capability value adjustment reference.

15 Claims, 9 Drawing Sheets

(51) Int. Cl.
*A63F 13/69* (2014.01)
*A63F 13/828* (2014.01)
*A63F 13/30* (2014.01)

(56) References Cited

U.S. PATENT DOCUMENTS

| | | | | |
|---|---|---|---|---|
| 8,099,182 | B1* | 1/2012 | Kasten | A63F 13/12 463/42 |
| 8,905,849 | B1* | 12/2014 | Coppersmith, III | A63F 13/65 463/1 |
| 2008/0039167 | A1* | 2/2008 | Harris | G07F 17/32 463/8 |
| 2009/0061989 | A1* | 3/2009 | Kim | A63F 13/10 463/23 |
| 2011/0256926 | A1* | 10/2011 | Sloan | A63F 13/10 463/29 |

FOREIGN PATENT DOCUMENTS

| | | |
|---|---|---|
| KR | 1020050074878 A | 7/2005 |
| KR | 1020050091438 A | 9/2005 |

* cited by examiner

Figure 4

| Skill capability value before an adjustment | Skill capability value after an adjustment | Up-width | Skill capability value before an adjustment | Skill capability value after an adjustment | Up-width | Skill capability value before an adjustment | Skill capability value after an adjustment | Up-width |
|---|---|---|---|---|---|---|---|---|
| 99 | 99 | 0 | 66 | 73 | 7 | 33 | 36 | 3 |
| 98 | 98 | 0 | 65 | 72 | 7 | 32 | 35 | 3 |
| 97 | 98 | 1 | 64 | 70 | 6 | 31 | 34 | 6 |
| 96 | 97 | 1 | 63 | 69 | 6 | 30 | 33 | 3 |
| 95 | 96 | 1 | 62 | 68 | 6 | 29 | 32 | 3 |
| 94 | 95 | 1 | 61 | 67 | 6 | 28 | 31 | 3 |
| 93 | 94 | 1 | 60 | 66 | 6 | 27 | 30 | 3 |
| 92 | 94 | 2 | 59 | 65 | 6 | 26 | 29 | 3 |
| 91 | 93 | 2 | 58 | 64 | 6 | 25 | 28 | 3 |
| 90 | 92 | 2 | 57 | 63 | 6 | 24 | 26 | 3 |
| 89 | 91 | 2 | 56 | 62 | 6 | 23 | 25 | 2 |
| 88 | 90 | 2 | 55 | 61 | 6 | 22 | 24 | 2 |
| 87 | 90 | 3 | 54 | 59 | 5 | 21 | 23 | 2 |
| 86 | 89 | 3 | 53 | 58 | 5 | 20 | 22 | 2 |
| 85 | 88 | 3 | 52 | 57 | 5 | 19 | 21 | 2 |
| 84 | 87 | 3 | 51 | 56 | 5 | 18 | 20 | 2 |
| 83 | 86 | 3 | 50 | 55 | 5 | 17 | 19 | 2 |
| 82 | 86 | 4 | 49 | 54 | 5 | 16 | 18 | 2 |
| 81 | 85 | 4 | 48 | 53 | 5 | 15 | 17 | 2 |
| 80 | 84 | 4 | 47 | 52 | 5 | 14 | 15 | 1 |
| 79 | 83 | 4 | 46 | 51 | 5 | 13 | 14 | 1 |
| 78 | 82 | 4 | 45 | 50 | 5 | 12 | 13 | 1 |
| 77 | 82 | 5 | 44 | 48 | 4 | 11 | 12 | 1 |
| 76 | 81 | 5 | 43 | 47 | 4 | 10 | 11 | 1 |
| 75 | 80 | 5 | 42 | 46 | 4 | 9 | 10 | 1 |
| 74 | 79 | 5 | 41 | 45 | 4 | 8 | 9 | 1 |
| 73 | 78 | 5 | 40 | 44 | 4 | 7 | 8 | 1 |
| 72 | 78 | 6 | 39 | 43 | 4 | 6 | 7 | 1 |
| 71 | 77 | 6 | 38 | 42 | 4 | 5 | 6 | 1 |
| 70 | 76 | 6 | 37 | 41 | 4 | 4 | 4 | 1 |
| 69 | 75 | 6 | 36 | 40 | 4 | 3 | 3 | 0 |
| 68 | 74 | 6 | 35 | 39 | 4 | 2 | 2 | 0 |
| 67 | 74 | 7 | 34 | 37 | 3 | 1 | 1 | 0 |

Figure 7

| Adjusted skill capability value | Limitation capability |
|---|---|
| Below 39 | 100 |
| Below 44 | 101 |
| Below 49 | 102 |
| Below 53 | 103 |
| Below 57 | 104 |
| Below 61 | 105 |
| Below 65 | 106 |
| Below 69 | 107 |
| Below 73 | 108 |
| Below 76 | 109 |
| Below 79 | 110 |
| Below 82 | 111 |
| Below 85 | 112 |
| Below 88 | 113 |
| Below 90 | 114 |
| Below 92 | 115 |
| Below 94 | 116 |
| Below 96 | 117 |
| Below 97 | 118 |
| Below 98 | 119 |
| More than 99 | 120 |

Figure 8

| Character information | | | |
|---|---|---|---|
| CN — | Character name | | |
| CI — | Character image | Common | 98/99 — SK1 |
| | | Attack | 97/99 — SK2 |
| | | Pass | 98/99 — SK3 |
| | | Defense | 99/99 — SK4 |
| | | Goalkeeping | 99/99 — SK5 |
| SK — | Total skill capability value | 491/495 | |
| ST — | Experience capability value | 10 | |

(a)

| Season character information | | | |
|---|---|---|---|
| CN — | Season character name | | |
| CI — | Season character image | Common | 98/119 — SK1 |
| | | Attack | 98/119 — SK2 |
| | | Pass | 98/119 — SK3 |
| | | Defense | 99/120 — SK4 |
| | | Goalkeeping | 99/120 — SK5 |
| SSK — | Total skill capability value | 492/597 | |
| ST — | Experience capability value | 10 | |

(b)

US 9,352,232 B2

METHOD FOR PROVIDING CHARACTER OF ONLINE GAME AND APPARATUS THEREOF

CROSS REFERENCE TO RELATED APPLICATIONS

This application is a 35 U.S.C. §371 National Phase Entry Application from PCT/KR2012/010002, filed Nov. 26, 2012, and designating the United States, which claims priority under 35 U.S.C. §119 to Korean Patent Application No. 10-2011-0145279 filed Dec. 28, 2011, which are incorporated herein in their entireties.

TECHNICAL FIELD

The present invention relates to a technique for preferring a season character of users by increasing a skill capability value of the season character in which a limitation capability value of a character is differentiated according to timing provided in a game compared with a general character in an online game managing the character.

BACKGROUND ART

On-line gaming is a field which is becoming more popular in an on-line cultural industry in recent years by the development of networks and computer technology. As online games are developed, the user requires online games in various genres, and currently, online games of many various genres are serviced.

Most online games presently serviced provide characters. The users use their terminals to access a game server, select a character provided by an online game, and adjust the character to enjoy the game. In the online game, there are characters that are provided without cost, and there are characters that the user must buy by using game points. When the user possesses a plurality of characters, he may alternately change a plurality of characters and may play a game. Among the online games providing a character, there is a game for the user to possess a team including a plurality of characters, individually scout, hire, or contract a plurality of respective characters configuring the team, and manage the team.

The character usable in the game may be provided without a limit of period to the user, and depending on the kind of game, the character usage period may be restricted, a character usage fee may be paid again through a renewal when the usage period has expired, and the usage period of the corresponding character may be extended.

One of such character providing games may provide special characters with capability values that are different from the general characters so as to add users' interest in the game. The special character may be set to have capability values that are greater than those of a general character or to have a special skill that is not assigned to other characters.

However, the general character or the special character has the skill or the capability value that is changed according to the level of the character, but a limitation capability value is basically predetermined to be specified. The character predetermined with the fixed limitation capability value is resultantly regarded as the same character irrespective of the current level of the character. That is, as the level of the character is increased, the character finally has the same capability.

Accordingly, there is a burden that the provider of the online game service should develop a new character to be provided to the game for the user that loses interest in the conventional character to continuously enjoy the game, and to solve this problem, the partial character among the conventional general character is respectively selected for a predetermined period section, and a season character that is set to have the different limitation capability value from the general character is provided.

The above information disclosed in this Background section is only for enhancement of understanding of the background of the invention and therefore it may contain information that does not form the prior art that is already known in this country to a person of ordinary skill in the art.

DISCLOSURE

Technical Problem

Technical Solution

Technical Object

The present invention controls a skill capability value of a season character predetermined with a different limitation capability value to that of a character according to a time provided in the game to be differentiated from the character that was regarded to be the same, and thereby the users further utilize the season character.

Technical Solution

A method for providing a character of an online game according to an exemplary embodiment of the present invention includes: obtaining information for at least one season character selected from among a plurality of general characters pre-provided in a game according to a season character selection reference and differentiated with a limitation capability value as an upper limit value of a skill capability value according to a selected period; setting a skill capability value adjustment rule to adjust a skill capability value among each piece of information for at least one season character; adjusting the skill capability value of the season character to be higher than the general character corresponding to the skill character according to the skill capability value adjustment rule; setting a limitation capability value adjustment margin for the season character; setting the limitation capability value adjustment reference; and setting a limitation capability value of the season character according to the limitation capability value adjustment reference.

In the obtaining of the information for at least one season character, the information for the general character selected as the season character may be obtained.

The setting of the skill capability value adjustment rule may include: setting at least one skill capability value adjustment rule; and setting a plurality of skill capability value adjustment rule application methods when the skill capability value adjustment rule is plural.

The adjustment to be higher than the general character may include: analyzing each skill capability value for a plurality of skills of the season character; and adjusting the analyzed skill capability value for a plurality of skills according to the skill capability value adjustment rule.

The setting of at least one skill capability value adjustment rule may include: multiplying a predetermined correction ratio by a difference value between the skill capability value of the general character selected as the season character and the predetermined upper limit value of the skill capability values, and setting a value of which the difference value multiplied by the predetermined correction ratio is subtracted from the predetermined upper limit value as a first skill capability value; setting a value of which a predetermined up-ratio is multiplied by the skill capability value of the general character as a second skill capability value; and setting any one of the first skill capability value and the second skill capability value as the skill capability value of the season character as the skill capability value adjustment rule.

The setting of a plurality of skill capability value adjustment rule application methods may include: setting the first skill capability value as the skill capability value of the season character when the first skill capability value is less than the second skill capability value; and setting the second skill capability value as the skill capability value of the season character when the second skill capability value is equal to the second skill capability value or is larger than the second skill capability value.

The setting of the limitation capability value adjustment margin for the season character may include: determining whether the special character having the limitation capability value that is higher than the limitation capability value of the general character is provided in the game; setting an adjustment margin of the limitation capability value between the limitation capability value of the general character and the limitation capability value predetermined to be higher than the limitation capability value of the general character if the special character is not provided; and setting the adjustment margin of the limitation capability value between the limitation capability value of the general character and the limitation capability value of the special character if the special character is provided.

The setting of the limitation capability value adjustment margin for the season character may include: determining whether the limitation capability value adjustment item increasing the predetermined limitation capability value of a plurality of general character by a predetermined capability value is provided in the game; setting an adjustment margin of the limitation capability value between the limitation capability value of the general character and the limitation capability value predetermined to be higher than the limitation capability value of the general character if the limitation capability value adjustment item is not provided; and setting the adjustment margin of the limitation capability value between the limitation capability value of the general character applied with the limitation capability value adjustment item and the limitation capability value predetermined to be higher than the limitation capability value of the general character if the limitation capability value adjustment item is provided.

The setting of the limitation capability value adjustment reference may include: dividing the skill capability value of the season character by a section interval of a predetermined skill capability value; and setting the different limitation capability value for the divided section interval of the skill capability value.

The setting of the limitation capability value of the season character may include: analyzing the adjusted skill capability value of the season character; and setting the limitation capability value of the season character by applying the analyzed skill capability value of the season character to the limitation capability value adjustment reference.

A method for providing a character of an online game according to another exemplary embodiment of the present invention through a character providing apparatus includes: obtaining information for at least one season character selected among a plurality of general characters pre-provided in a game according to a season character selection reference and differentiated with a limitation capability value as an upper limit value of a skill capability value according to a selected period; setting a skill capability value adjustment rule to adjust a skill capability value among each piece of information for at least one season character; adjusting the skill capability value of the season character to be higher than the general character corresponding to the skill character according to the skill capability value adjustment rule; setting a limitation capability value adjustment margin for the season character; setting the limitation capability value adjustment reference; setting a limitation capability value of the season character according to the limitation capability value adjustment reference; and adding a hidden capability value such that information of the season character is not displayed to a skill capability value of at least one season character.

In the adding of the hidden capability value, the same hidden capability value may be added for the skill capability value of at least one season character.

In the adding of the hidden capability value, the hidden capability value may be respectively added to each skill capability value of a plurality of skills of the season character.

A character providing apparatus according to an online game according to an exemplary embodiment of the present invention includes: a character information storing unit storing information for a plurality of general characters and at least one season character selected from among a plurality of general characters pre-provided in a game according to a season character selection reference and differentiated with a limitation capability value as an upper limit value of a skill capability value according to a selected period; a season character capability value adjusting unit setting a skill capability value adjustment rule to adjust a skill capability value among each piece of information for at least one season character and adjusting each skill capability value of at least one season character to be higher than the general character corresponding to the skill character according to the predetermined skill capability value adjustment rule; and an item information storing unit storing a plurality of pieces of item information.

The season character capability value adjustment unit may analyze each skill capability value of a plurality of skills of the season character and adjust the analyzed skill capability value of a plurality of skills according to the skill capability value adjustment rule.

The season character capability value adjustment unit may set a limitation capability value adjustment margin for the season character and set a limitation capability value of the season character according to the limitation capability value adjustment reference.

The season character capability value adjustment unit may set the adjustment margin of the limitation capability value to be between the limitation capability value of the general character and the limitation capability value predetermined to be higher than the limitation capability value of the general character if information for a limitation capability value adjustment item increasing the limitation capability value of a plurality of general characters by a predetermined capability value is transmitted from the item information storing unit.

The season character capability value adjustment unit may set the adjustment margin of the limitation capability value to be between the limitation capability value of the general character and the limitation capability value predetermined to be higher than the limitation capability value of the general character if information for a limitation capability value adjustment item increasing the limitation capability value of a plurality of general characters by a predetermined capability value is transmitted from the item information storing unit.

The season character capability value adjustment unit may set the adjustment margin of the limitation capability value to be between the limitation capability value of the general character and the limitation capability value of the special character if information for the special character having the limitation capability value higher than a plurality of general characters is transmitted from the character information storing unit.

Advantageous Effect

According to the present invention, the skill capability value is increased for the season character differentiated with the limitation capability value of the character according to the time provided in the game and the hidden capability value is provided, thereby adjusting and providing the entire capability value of the season character. Accordingly, the user may clearly feel the difference between the season character and the general character, thereby increasing the preference of the user for the season character.

ADVANTAGEOUS EFFECTS

Description of the Drawings

FIG. 4 shows an adjustment history of a skill capability value according to one example of the present invention.

FIG. 7 shows a limitation capability value adjustment table of a season character according to one example of the present invention.

FIG. 8 shows an information screen of a season character according to one example of the present invention.

MODE FOR INVENTION

Figure 1:
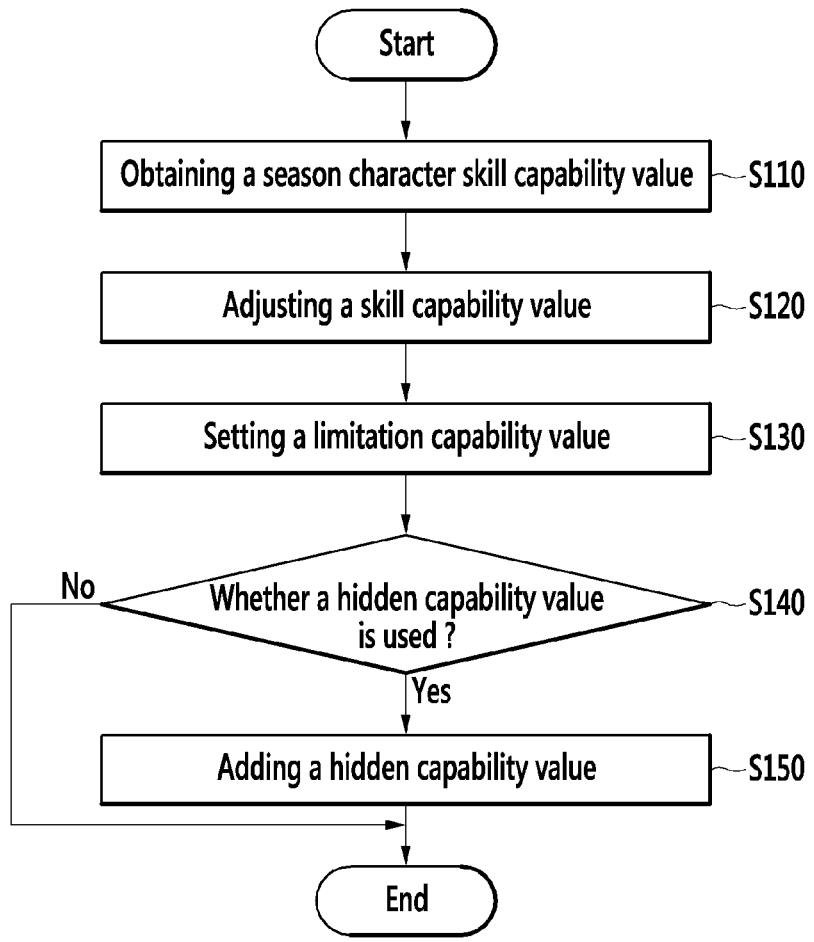
FIG. 1 is a flowchart of a method for providing a character of an online game according to an exemplary embodiment of the present invention.

Hereinafter, a method for providing a character of an online game and an apparatus therefor according to an exemplary embodiment of the present invention will be described with reference to accompanying drawings.

It is obvious that the following exemplary embodiment is a detailed description which is provided for better understanding of the present invention but does not limit the scope of the present invention. Therefore, an equivalent invention which performs the same function as the present invention may also be covered by the scope of the present invention.

In adding reference numerals to components of each drawing, even though the same components are illustrated in different drawings, it is to be noted that these components are denoted by the same reference numerals if possible. In describing exemplary embodiments of the present invention, well-known functions or constructions will not be described in detail since they may unnecessarily obscure the understanding of the present invention.

In addition, in describing components of the present specification, terms such as first, second, A, B, (a), and (b) may be used. These terms are used only to differentiate the components from other components, but the nature, sequence, order, etc. of the corresponding components are not limited by these terms. When a component is "connected", "coupled", or "linked" to another component, it is to be noted that the component may be directly connected or linked to the other component, but the component may be "connected", "coupled", or "linked" to the other component via another component therebetween.

In an exemplary embodiment of the present invention, "communication", "communication network", and "network" may be used to have the same meaning. The three terminologies indicate a wired or wireless local area and wide area data transmitting/receiving network through which a file is transmitted/received between a user terminal, another user terminal, and a download server.

In the following description, "game server" indicates a server computer that users access to use game contents. In the case of a game which has a small capacity or a small number of users, a plurality of game programs may be operated by one game server. Further, in the case of a game which has a large capacity or a large number of real time accessing members, one or more game servers which operate one game may be provided depending on a function of the game.

In addition, middleware for databases or servers which perform payment processing may be connected to the game server, but the description thereof will be omitted in the present invention.

In the present invention, characters indicate all characters which appear in the game through which users experience one of sports among on-line games. The game character appears on a game screen and shows a predetermined action in accordance with the manipulation of the user. Further, the game character increases a level by accumulating predetermined experience points in accordance with a result of playing the game, and when the level is increased, a capability point of the character becomes stronger.

The skill of the character may be set in various ways according to the characteristic of each game, and for example, when the online game is an online fantasy game, it may be set as magic, attack, and defense as sorts of skills owned by the character. Further, when the online game is an online soccer game, the common, attack, pass/dribble, defense, and goalkeeping for indicating skills of a player corresponding to the character may be set as the sorts of skills of the character. Each skill may be further subdivided and provided according to game settings. For example, detailed skills such as power and accuracy may be provided for the attack from among the skills of the online fantasy game, and detailed skills such as endurance, physical strength, and composure may be provided for the common in the online soccer game. The user changes the capability points to each skill with different ratios so that the same characters provided to the users with the same characteristics may grow to be characters with different characteristics according to a change form of the respective users' capability point into the skill point. That is, when the user receives the same character and plays a game, he changes the capability point into various kinds of skill points and uses the same to allow different respective characters' characteristics, thereby growing the characters having different characteristics.

In the present invention, a limitation capability value represents an upper limit of the level of the character, and the upper limit of the character level may be set as the sum of the upper limits for a plurality of skill capability values. Most online games setting the level of the character set the upper limit to a skill capability value of each character to maintain justice in the game progress, and the sum of these upper limits as a sum of all capability values of the character may determine a limitation capability value.

In the present invention, sports indicate general sports and all kinds of sports which may be played as an on-line game. For example, the sports include soccer, baseball, basketball, tennis, volleyball, track sports, or martial arts.

In the present invention, the character usage fee and cost do not mean the amount of commodity money, but the cyber money or game points with which the user may buy a character or an item in the online game. The user may acquire the cyber money and the game points when he plays the game, and depending on the cases, he may acquire cyber money or game points by selling items acquired while playing the game to a shop in the game. Further, depending on the game, he may pay commodity money and acquire cyber money. The amount of commodity money may individually match the amount of cyber money, and in general, they are set in a different manner. Depending on the game, the cyber money may be changed to the game points of the online game. That is, the cyber money and the game points may be exchanged mutually or in a single direction.

In the present invention, a season character means a character granting a distinction to use the characters that are identified by the same limitation capability value conventionally as a character having a different capability value by differentiating the limitation capability value of the character according to a time of provided on the game. That is, the season character is not generated as a completely new character that is different from the conventional character, but is a character that is set with the different limitation capability value from the general character or the other season character. Also, a plurality of season characters may be generated by utilizing the same general character. In this case, each limitation capability value of a plurality of season character is set to be different. If necessary, the limitation capability value of a plurality of season characters may be set to be the same, however the skill limitation capability value for a plurality of skills of the season character may be set to be different although the limitation capability values are the same. Here, the skill limitation capability value means an individual limitation capability value for each skill of the character. As described above, if the season character may have the different limitation capability value according to the provided timing, the characters of the very various kinds may be utilized for a user's point of view, thereby increasing the interest of the user for the game. Also, the online game service provider may reuse the character that is developed conventionally such that the character development cost may be reduced.

FIG. 1 is a flowchart of a method for providing a character of an online game according to an exemplary embodiment of the present invention.

Referring to FIG. 1, in a method for providing a character of an online game if the present invention, firstly, information for the capability value of the season character is gained from information of at least one season character (S110).

The season character may have different capability values according to a generated time although the season character is generated by utilizing the same general character on a characteristic. Also, in the present invention, since the capability values of all season characters are updated, the information for the capability value of the season character is gained from the information of all season characters provided in the game. At this time, for the capability value of the gained season character, the total skill capability value and the total limitation capability value may only be gained, however it is preferable that the skill capability value of each skill and the skill limitation capability value of each skill are gained together.

If the skill capability value for the season character is gained, the skill capability value for all season characters is controlled (S120). In the present invention, it is assumed that the skill capability value of the season character is increased, and if necessary, the skill capability value may be decreased.

If all season characters are increased by the same capability value when increasing the skill capability value for the season character, there is a problem that a distinction of the high level season characters having the upper skill capability value is decreased. This is because the upper value of the skill capability value is limited by the limitation capability value. For example, when the skill capability value of three season characters is 89 and the skill capability value of two season characters is 99 among the season characters predetermined with the limitation capability value of 99, if the 10 skill capability value is increased for five season characters, the skill capability value of five season characters is determined as 99. That is, the season characters that initially have the 10 skill points becomes the character having the same skill capability value. Therefore, if the skill capability value of the season characters is increased without the change of the limitation capability value, many season characters have the same limitation capability value, and this does not correspond to the meaning of the season characters to provide the various characters. Although the season character is not only set to have the higher limitation capability value compared with the general character, but also the limitation capability value of the season character is set to be different according to the generation time of the season character, the total increasing of the capability value is not preferable in a management viewpoint of the game.

Accordingly, in the present invention, the skill capability value of the season character is increased according to the predetermined rule, and the rule to increase the skill capability value of the season character will be described later.

If the skill capability value for the season character is controlled, the limitation capability value for each season character is set next. In this case, the limitation capability value for each season character is set with reference to the controlled skill capability value. The conventional season character is also set to have the relatively higher limitation capability value than the general character, and the limitation capability value is set to be different according to the generation timing of each season character. In this case, the reference setting the limitation capability value of the season character is set with reference to the skill capability value of the general character that is selected as the season character. However, in the present invention, since the skill capability value of the season characters are controlled in the step (S120) for controlling the skill capability value, the limitation capability value of the season character is set with reference to the skill capability value of the controlled season character.

If the limitation capability value for at least one season character is respectively set, it is determined whether a hidden capability value is used (S140). The hidden capability value is a skill capability value that is not displayed to the users. That is, when the user manages the character having the hidden capability value, the user may feel the higher skill capability value than the skill capability value of the character that may be confirmed from a character information screen or other character information in the game progress. For example, in the case of the character having the hidden capability value of 5 and the skill capability value of 80, the user confirms that the capability value of the character is 80, but the skill capability value of the character is actually set as 85 in the game. Accordingly, in spite of the character having the same skill capability value, the character having the hidden capability value actually has the higher skill capability value than the character with the hidden capability value. The hidden capability value is a capability value that may not be explicitly confirmed by the user in the game such that an uncertainty is added to the game, thereby being used as a factor for making a more exciting game.

If it is determined that the season character uses the hidden capability value, the hidden capability value for at least one season character is added (S140). The same hidden capability value may be totally added for the season character, or may be randomly added. Also, like the limitation capability value, the hidden capability value may be differentiated according to the skill capability value. However, if the hidden capability value is added according to the skill capability value like the limitation capability value, the skill capability value, the limitation capability value, and the hidden capability value are all largely increased for the conventional season character having the high skill capability value, however an increasing ratio of the skill capability value, the limitation capability value, and the hidden capability value is low for the conventional season character having the low skill capability value such that the distinction of the season character and the general character may be suitable.

Figure 2:
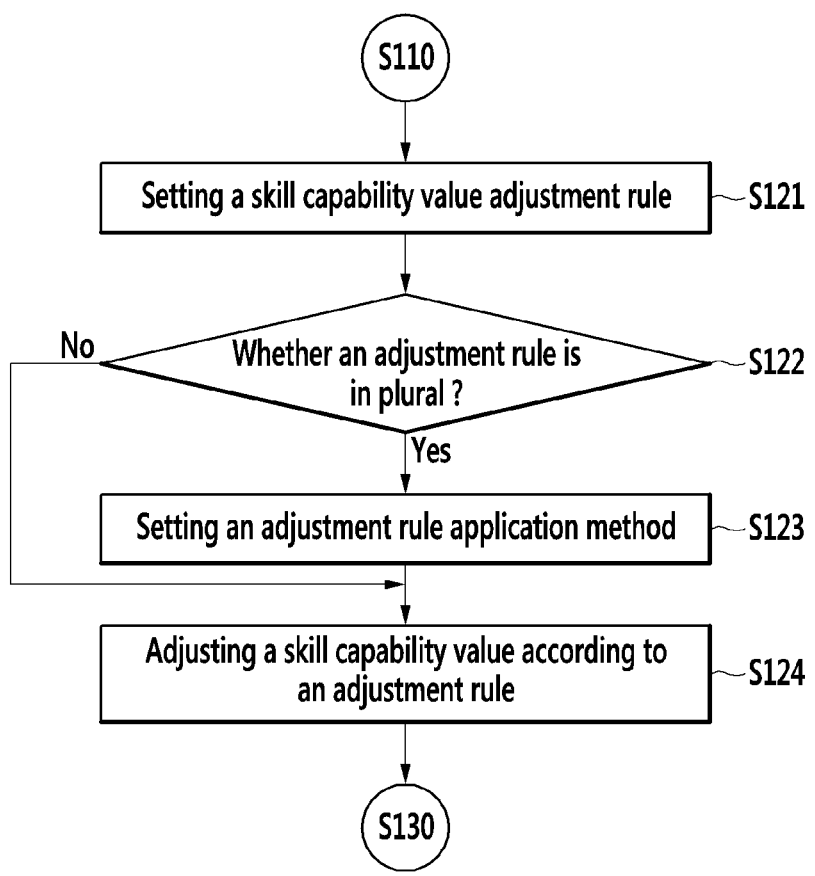
FIG. 2 is a flowchart for selecting a season character according to one example of the present invention.

FIG. 2 is a flowchart for controlling a season capability value according to one example of the present invention.

In the flow controlling the skill capability value, an adjustment rule to adjust the skill capability value is firstly set (S121). The adjustment rule to adjust the skill capability value may be variously set according to a kind of the game and the skill capability value that is predetermined in the game. The adjustment rule to adjust the skill capability value may be variously predetermined for smooth management of the game service provider. Also, a plurality of adjustment rules may be set.

In the present invention, as one example of the adjustment rule, the adjustment rule to adjust the skill capability value of the season character is set based on the skill capability value of the general character to be selected as the season character. Also, the adjustment rule is not set as one adjustment rule, but may be used by combining a plurality of adjustment rules. Further, in the present invention, the skill capability value of the season character is controlled by combining two adjustment rules of Equation 1 and Equation 2.

$$SSK1=100-(100-SK)*0.8 \quad \text{[Equation 1]}$$

Here, SSK1 is a first skill capability value of the season character, and SK is the skill capability value of the general character selected as the season character. Also, SSK1 and SK are natural numbers having a maximum value of 99. When SSK1 is not a natural number, SSK1 is rounded.

$$SSK2=SK*1.1 \quad \text{[Equation 2]}$$

Here, SSK2 is a second skill capability value of the season character, and SK is the skill capability value of the general character as the season character. Also, SSK2 and SK are natural numbers having a maximum value of 99. When SSK2 is not a natural number, SSK2 is rounded.

If the skill level of the season character is controlled by combining a plurality of adjustment rules, the skill capability value of the season character may be controlled by the various methods compared with totally increasing the skill capability value of the general character selected as the season character, such that the distinction between the season character may be prevented from being decreased for a certain section of the skill capability value.

The adjustment rule of Equation 1 is the adjustment rule that is preferable when the general character having the high skill capability value is selected as the season character, and the adjustment rule of Equation 2 is the adjustment rule that is preferable when the general character having the low skill capability value is selected as the season character.

If the adjustment rule of the skill capability value is set, it is determined whether the adjustment rule is one or plural (S122). When the adjustment rule is one, one adjustment rule may be totally applied to adjust the skill capability value for the season character, and when the adjustment rule is plural, it must be set whether any adjustment rule is applied among a plurality of adjustment rules. If the adjustment rule is plural, an adjustment rule application method is set (S123).

$$\text{IF}(SSK1<SSK2),$$

$$SSK=SSK1,$$

otherwise, $$SSK=SSK2 \quad \text{[Equation 3]}$$

Equation 3 represents a plurality of adjustment rule application methods according to one example of the present invention. According to Equation 3, the first skill capability value SSK1 of Equation 1 is lower than the second skill capability value SSK2 of Equation 2, the first skill capability value SSK1 is set as the skill capability value of the season character, and the second skill capability value SSK2 is set as the skill capability value of the season character in the rest.

If the adjustment rule application method is set, the skill capability value of the season character is controlled according to at least one adjustment rule and the adjustment rule application method (S124).

In above, the skill capability value is simply controlled for the season character, however each skill capability value for a plurality of skills for the season characters may be controlled by the described skill capability value adjustment method. Also, the total skill capability value as a sum of the skill capability values for a plurality of skills for the season characters may be controlled by the described skill capability value adjustment method.

Figure 3:
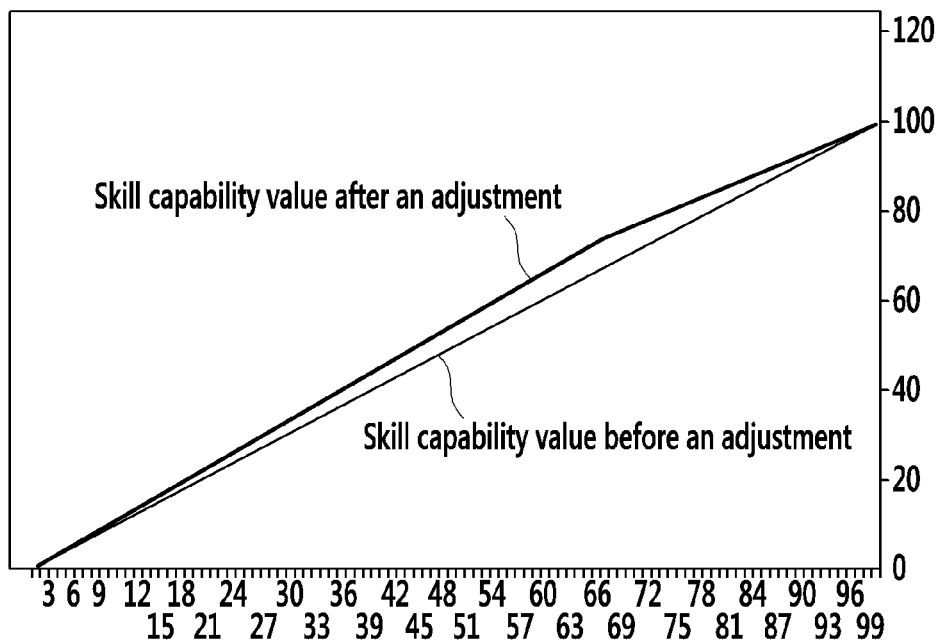
FIG. 3 shows an adjustment state of a skill capability value according to another example of the present invention.

FIG. 3 shows an adjustment state of a skill capability value according to one example of the present invention.

As shown in FIG. 3, if the skill capability value of the season character is controlled by applying Equation 1 to Equation 3, when the skill capability value is very high or very low, a difference between the skill capability values is not large, but the skill capability value of the season character is controlled to a large width in the middle region of the skill capability value.

FIG. 4 shows an adjustment history of a skill capability value according to one example of the present invention.

The skill capability value of FIG. 4 is shown by assuming the character of which the limitation capability value predetermined in the game is 99. Referring to the adjustment history of the skill capability value shown in FIG. 4, the skill capability value is not controlled in the lowest 1 to 4 skill capability values and the highest 98 and 99 skill capability values. However, in the 55 to 72 skill capability values that are the relative middle region, the skill capability value of 6 or 7 is improved. As described above, if the skill capability value is controlled with a curved line shape for the total section of the conventional skill capability value, the skill capability value of the season character may be increased to have the distinction without burdening the overall balance of the game.

Figure 5:
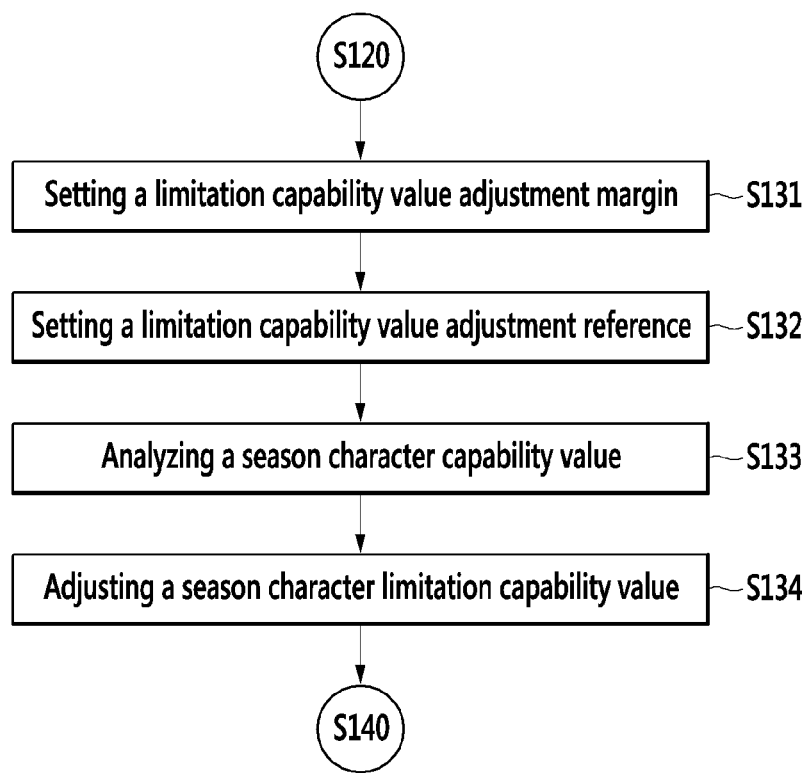
FIG. 5 is a flowchart for setting a limitation capability value of a season character according to another example of the present invention.

FIG. 5 is a flowchart for setting a limitation capability value of a season character according to one example of the present invention.

In the flow setting of the limitation capability value, an adjustment margin of the limitation capability value is firstly set (S131). In the game, since the limitation capability value is set to maintain the overall balance of the game, the limitation capability value may not be highly set without the limitation. If there is no limitation for the limitation capability value, the balance of the game is broken and the user loses interest in the game. Accordingly, the limitation capability value should be determined very carefully. Also, an item for increasing the limitation capability value of the character may be provided to provide diversity of the game in the partial game, and a special character having a higher limitation capability value than the general character may be provided. If the limitation capability value is set to overlap regardless of the kind of the character, to distinguish the kind of the character may be meaningless such that it is not necessary to confirm the limitation capability value provided to the character of the different kind or the item in the game when setting the limitation capability value for the season character.

Accordingly, the margin setting for the limitation capability value of the season character is essential.

If the adjustment margin for the limitation capability value is set, the reference to adjust the limitation capability value is set within the predetermined adjustment margin (S132). The reference to adjust the limitation capability value may be provided with at least an equation type like the adjustment of the skill capability value, and a limitation capability value adjustment table to adjust the limitation capability value may be predetermined.

If the limitation capability value adjustment reference is set, the skill capability value of the season character is analyzed (S133).

If the limitation capability value of the season character is totally changed, it is not necessary to analyze the skill capability value of the season character. However, a basic characteristic of the season character is that the limitation capability value of the season character may be changed according to the generation time. This characteristic becomes an important reference for distinguishing the season character from the general character or the special character. Accordingly, to differentiate the limitation capability value of the season character for each season character, the skill capability value of the season character is analyzed.

Also, the limitation capability value of the season character is controlled by applying the analyzed skill capability value of the season character to the adjustment reference of the predetermined limitation capability value (S134).

Figure 6:
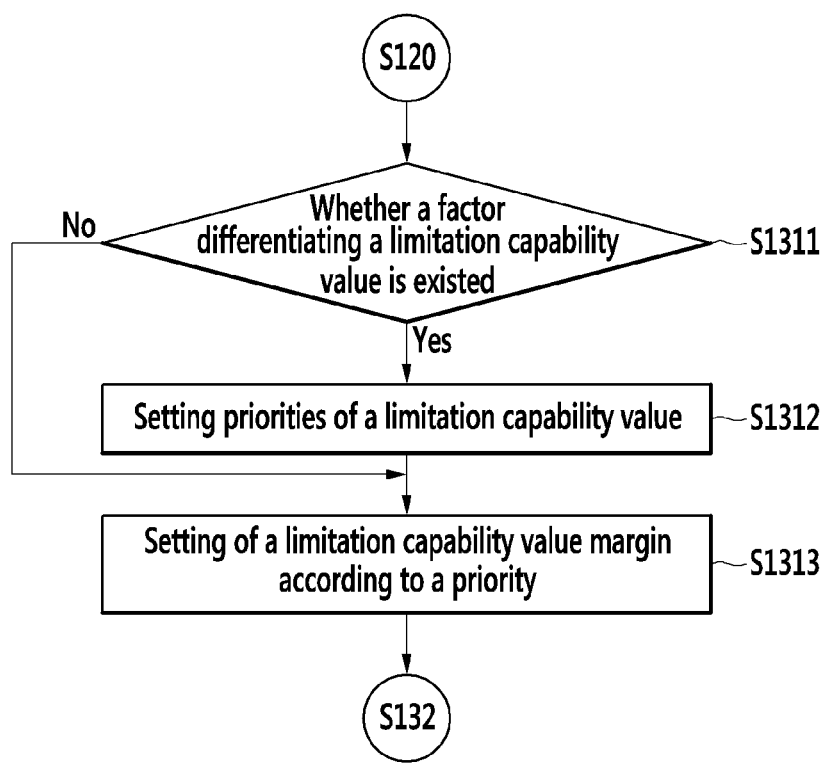
FIG. 6 shows flow setting of an adjustment margin of a limitation capability value of a season character according to another example of the present invention.

FIG. 6 shows flow setting of an adjustment margin of a limitation capability value according to one example of the present invention.

In the flow setting the adjustment margin of the limitation capability value, it is firstly determined whether a factor for differentiating the limitation capability value exists in the game (S1311). The limitation capability values of all general characters provided in the game are basically set equal to each other. However, the differentiation of the character is not generated between the general characters having the high skill capability value by the equally predetermined limitation capability value. As described above, in some games, a limitation capability value adjustment item controlling the limitation capability value or the special character having the differentiated limitation capability value may be provided. The limitation capability value adjustment item or the special character having the differentiated limitation capability value is provided on the game before the season character is provided, and is used to the many users. Accordingly, when providing the season character, it is necessary to adjust the limitation capability value of the season character by considering the limitation capability value adjustment item or the limitation capability value of the special character. Therefore, in the present invention, when setting the adjustment margin of the limitation capability value, it is firstly determined whether the factor differentiating the limitation capability value exists in the game.

If the differentiation factor of the limitation capability value exists, which differentiation factor of the limitation capability value and the season character that has greater priority is set (S1312). This is to prevent the overlapping of the limitation capability value according to the kind of the character or the item, and in general, the special character that is previously provided in the game and the limitation capability value adjustment item have the priority.

Also, if the priority is set, the margin of the limitation capability value of the season character is set according to predetermined priorities. For example, if the limitation capability value of the general character is 99 in the game and the game provides the special character of which the limitation capability value is 120, the season character is preferably set to having the limitation capability value of 100 to 120 as the limitation capability value between the general character and the special character. In the present invention, it is assumed that the special character of which the limitation capability value is 120 is provided in the game such that it is assumed that the margin of the limitation capability value for the season character is set between 100 and 120.

If the differentiation factor of the limitation capability value does not exist, the limitation capability value is basically set by only considering the limitation capability value of the general character. That is, if the limitation capability value of the general character is 99 in the game, the limitation capability value of the season character may be set to be more than 100. However, as described above, an upper limit value at which the limitation capability value may be set must be set in advance. This is because it is necessary to limit the limitation capability value for the balance of the game.

FIG. 7 shows a limitation capability value adjustment table of a season character according to one example of the present invention. In FIG. 7, the limitation capability value adjustment table that is predetermined in advance by the limitation capability value adjustment reference is used. Also, the limitation capability value adjustment table of FIG. 7 is one example, and the limitation capability value adjustment table sets the limitation capability value with reference to the skill capability value adjusted for the season character. It is assumed that a total range of the skill capability value of the adjusted skill capability value of the season character is the 1-99 skill capability values, like FIG. 3 to FIG. 5. Also, the margin of the limitation capability value is 100 to 120 according to the above assumption. Therefore, the limitation capability value adjustment table of FIG. 7 sets the limitation capability value of the season character having the 1-99 skill capability values to between 100 and 120.

Also, the described limitation capability value may be the skill limitation capability value for each skill.

FIG. 8 shows an information screen of a season character according to one example of the present invention.

In FIG. 8, (a) represents the information screen for the conventional general character, (b) represents the information screen of the season character according to the present invention, and it is assumed that the (b) character is the season character selected from the (a) general character.

The information screen of the character of FIG. 8 may be displayed when confirming the character information in the game progress or executing a character contract. The user may select a game access screen or a character information button in the game progress and may confirm the character or the information of the character.

In (a) and (b) of FIG. 8, the character information screen displays a character name CN, a character image CI, skill capability values for each skill SP1-SP5, a total skill capability value SK, and an experience capability value ST. The character name CN is a name given to each character and is specified in the game, however it may be directly specified by the user.

The character image CI represents an outer shape of the character displayed in the game, and is generated as an image specified in advance in most games. However, recently, in some games, the user may directly realize the image of the character by various combinations, and when a player of an online sports game is utilized as the character, the players of the corresponding sports game may be actually realized by imaging them.

The skill capability values SP1-SP5 for each skill numerically represent the current skill capability value for a maximum capability value (hereinafter referred to as a level skill capability value) to be predetermined in the current level for each skill. Each skill kind may be variously controlled according to the settings of the game, as described above, and in the present invention, as one example of the online game, the skill of the online football game is shown. The skill capability value for each kind shown in FIG. 8 is provided with 5 skill kinds such as common, attach, pass, defense, and goalkeeping, and the capability value for each skill of the player corresponding to the character in the online football game is shown.

Referring to the skill capability value for each kind of the character with reference to FIG. 8 (*a*), for the current character, the skill capability value for the common is 98, the skill capability value for the attack is 97, the skill capability value for the pass is 98, the skill capability value for the defense is 99, and the skill capability value for the goalkeeping is 99. Accordingly, the character displayed in FIG. 8 (*a*) is the character of which the most skills are close to the upper limit value.

Also, referring to the level skill capability value for the current character, all level skill capability values are set as 99. In the present invention, it is assumed that the margin of the level skill capability value, that is, the skill limitation capability value for each skill, is 99.

When the level skill capability value is described in detail, as described above, the skill capability value represents the capability value of the character in the game, and it can be regarded that the character of which the skill capability value is high basically has excellent game performance. However, when the skill capability value of the character used for the game execution of the user is higher than the level of the game that should be executed by the user, the ability of the character is superior to the difficulty of the game such that the interest in the game may rather disappear. Accordingly, in many of the online games, the character level that is increased stepwise is set according to the difficulty of the game, and the level skill capability value corresponding to each level is set. Thus, if the level of the character is determined, the level skill capability value corresponding to the level of the character is automatically set, before the level of the character is increased, and the user is limited to not increase the skill capability value more than the predetermined level skill capability value. That is, the level skill capability value represents the limitation value that may increase the skill capability value of the character corresponding to the level of the character. In this case, the level skill capability value is not totally set as the capability value in proportion to the level of the character, but may be differently set by considering the characteristic of the character. That is, as shown in FIG. 8 (*a*), for the character of the aggression, the level skill capability value for the attack skill and the pass skill may be set to be relatively high, and in contrast, for the defense-minded character, the level skill capability value for the defense skill and the goalkeeping skill may be set to be relatively high. The character of FIG. 8 (*a*) is the character of the highest level in which all levels are predetermined with the level skill capability value of the skill limitation capability value of 99 points.

The total skill capability value SK represents the sum of the skill capability values for each kind. In FIG. 8, the total skill capability value SK as the sum of the skill capability values for each kind is 98+97+98+99+99=491 by summing the common skill capability value 98, the attack skill capability value 97, the pass/dribble skill capability value 98, the defense skill capability value 99, and the goalkeeping skill capability value 99. Likewise, the limitation capability value as the sum of the level skill capability values for each kind is calculated into 99*5=495. That is, the limitation capability value is the maximum skill capability value that may be gained in the current level of the character. Accordingly, in the character information shown in FIG. 8 (*a*), since the total skill capability value of the character is 491 and the level skill capability value is 495, the displayed character has the potential that may increase the skill capability value by 495−491=4 points in the current level.

Also, the experience capability value ST is represented as 10. As described above, the experience capability value is a point that may be converted into the skill capability value by the user, and may be converted into the skill capability value for each kind. When the experience capability value is converted into the skill capability value for each kind, a ratio is generally 1:1. In FIG. 8 (*a*), since the experience capability value is 10, the experience capability value 2 is converted into the attack skill capability value, the attack skill capability value is increased by 2 and becomes 99, and in contrast, the experience capability value is decreased by 2 and becomes 8. However, since the skill limitation capability value is set for each kind of character, the possessed experience capability value may not be all converted into the attack skill capability value. In FIG. 8 (*a*), the attack level skill capability value is set as 99 and the current attack skill capability value is 97, such that the maximum margin that the experience capability value can be converted into the attack skill capability value is 99−97=2.

Although not shown, + and − buttons are added at one side of the skill capability value for each kind, and thereby the skill capability value may be increased or decreased. For example, if the + button provided at one side of the defense skill capability value is clicked, the defense skill capability value is increased, and the experience capability value ST is proportionally decreased. In contrast, if the − button is clicked, the defense skill capability value is decreased, and the experience capability value ST is increased. In this case, the skill capability value decreased by the click of the − button may not be lower than the predetermined skill capability value (i.e., the previously predetermined skill capability value) when the character information screen is firstly displayed. That is, the − button cannot decrease the capability value that is larger than the capability value such that the skill capability value is increased by clicking the + button in the current character information screen. This is to have the attention to the growth of the character by the user and to prevent the balance of the game from being broken by providing too high a freedom to the user.

Also, although not shown, if the corresponding skill is clicked for skill capability value of each kind, skill for each detailed kind may be expanded, and the skill capability value for each detailed kind may be set.

The skill capability value and the experience capability value may be set to a real value, however in most games, the point is set to a positive integer type to be intuitively confirmed by the users. Hereafter, in an exemplary embodiment of the present invention, for better comprehension and ease of description, it is assumed that the point is set to the positive integer.

Also, in FIG. 8 (*a*), the total limitation capability value is 495, however the total skill capability value is 491 and the experience capability value is 10. In this case, when the experience capability value is all converted to the skill capability value, the total skill capability value must be 505, however, in reality, the total skill capability value of more than the limitation capability value may not be set such that the experience capability value of more than 4 may not be used even though the experience capability value is 10, and the total skill capability value is not over 495.

However, referring to the season character information shown in FIG. 8 (*b*), the skill limitation capability values for the common attack and the pass are respectively 119, and the skill limitation capability value for the defense and the goalkeeping are respectively 200 and are over 99 that is the skill limitation capability value of the general character of (a). This is the value that the skill limitation capability value for each skill of the season character is adjusted according to the setting of the limitation capability value of the season character. In the season character, the skill limitation capability value for each skill may be variously set according to each character. In FIG. 8 (*b*), the skill limitation capability value for the attack, the defense, and the goalkeeping are up-adjusted, however for the season characters generated at the different period for the same general character and the season characters generated at the same period for the different character, the skill limitation capability value for the pass and the common may be up-adjusted. In FIG. 8 (*b*), the limitation capability value of the skill limitation capability value is also set as 597, however the different characters may be set to a different value.

Also, the attack skill of the season character is increased to 98, differently from the character of (a). This is the result according to the up-adjustment of the skill capability value of the season character according to the present invention, and even though the point difference is slight because the general character of (a) is the high level character, it is indicated that the attack skill capability value of the season character is higher than the general character of (a).

For the season character shown in FIG. 8 (*b*), the limitation capability value is up-adjusted compared with the general character such that the experience capability value 10 may be all converted into the skill capability value, and this is a factor differentiating the season character from the general character regardless of the current level of the character. Also, as the skill capability value is increased, and even though the user does not gain and grow the season character, the ability that is relatively high compared with the general character may appear.

Also, when totally providing the 5 hidden capability value for the season character, particularly providing the hidden capability value for each skill, although the total skill capability value is displayed as 492 in (b) and the difference from the total skill capability value 491 of the general character of (a) is almost none, the total skill capability value of 5*5=25 as the hidden capability value for each skill is added to the season character in the actual game progress such that the actual capability value of the season character becomes 517, and thereby the difference that may be felt by the user between the characters can be large.

Figure 9:
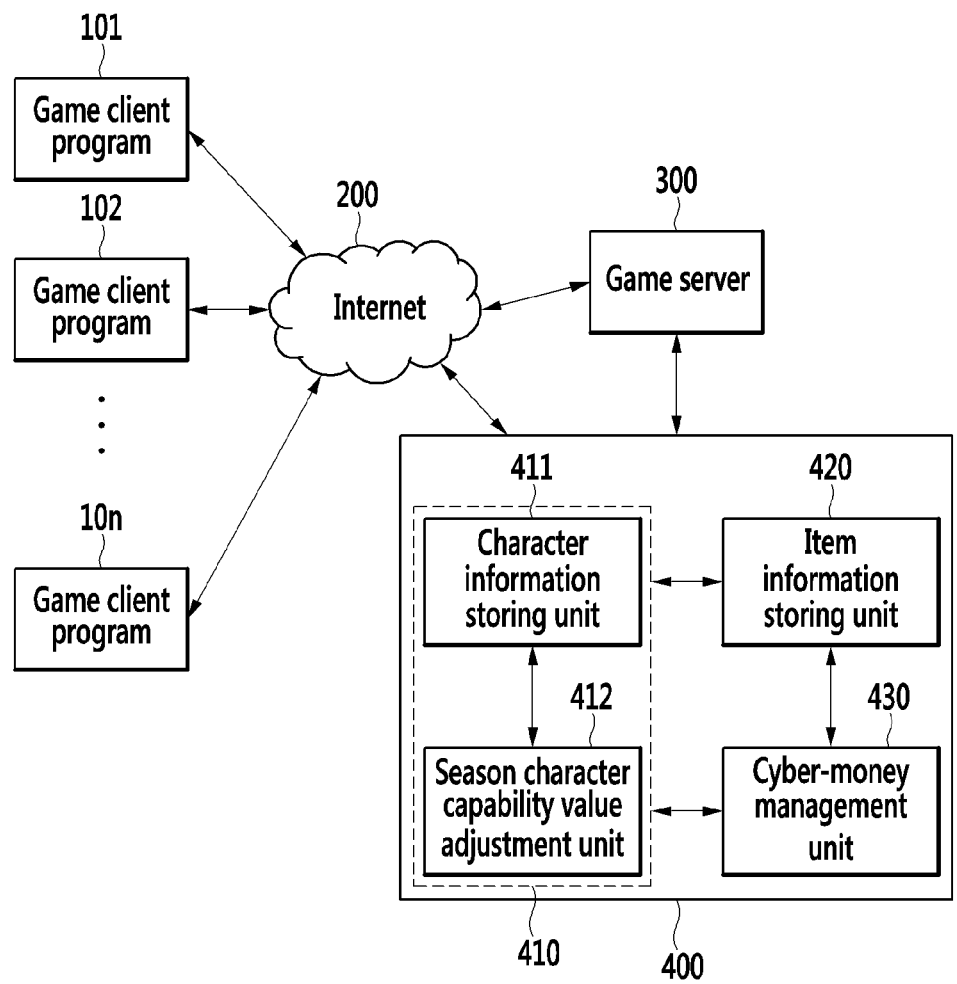
FIG. 9 is a block diagram of an apparatus for providing a character of an online game according to an exemplary embodiment of the present invention.

FIG. 9 is a block diagram of an apparatus for providing a character of an online game according to an exemplary embodiment of the present invention.

As shown in FIG. 9, a system for providing a special character of an online game according to an exemplary embodiment of the present invention includes a plurality of user terminals 101-10*n*, the Internet 200, a game server 300, and a character providing apparatus 400. A plurality of user terminals 101-10*n* are respectively connected to the game server 300 through the Internet 200 and are installed with a game client to execute the game.

The game server 300 provides a web page to be connected to the user, thereby providing several services such as chat, communities, and shopping malls as well as the Internet game to the plurality of the user terminals 101-10*n*. In FIG. 8, a plurality of the user are connected to the game server 300 through the computers 101-10*n*, however other terminals connected to the game server 300 through the Internet 200 as well as the computer may be used. For example, a mobile communication terminal or a television which can access the Internet may be used.

Also, in the present invention, the game server 300 provides the game entry screen for selecting a game condition by the user.

If the user enters the game through the web page, the game server 300 drives the game client that is previously installed to the user terminals 101-10*n*, and the user terminals 101-10*n* are connected to the game server 300 through the Internet 200 by the driven game client. Here, it is assumed that the game client is previously installed to the user terminals 101-10*n*, however the game server 300 determines whether the game client is not installed to the user terminals 101-10*n* and controls to install the game client for the corresponding game at a necessary time.

Also, the game server 300 may include a game database (not shown) storing a logic for each game to adjust the game. In this case, the game logic represents a specified rule to automatically perform the game according to a predetermined rule, and means one progression process of the game.

The character providing apparatus 400 includes an information storing unit 410 storing the character information and a season character pool (앞에서 언급되지 않은 내용입니다??), an item information storing unit 420 storing various item information, and a cyber-money management unit 430 managing cyber-money of the user or a game point. The information storing unit 410 includes a character information storing unit 411 storing information for a plurality of general characters and at least one piece of season character information, and a season character pool storing unit 412 storing at least one season character pool. The character information storing unit 411 also stores the information for the special character along with the general character information when providing the special character in the online game. Also, the season character capability value adjustment unit 412 analyses the skill capability value of the general character selected as the season character to adjust the skill capability value of the season character and the limitation capability value of the season character of the skill capability value of the adjusted season character. Also, it is determined whether the hidden capability value is added for the season character to add the hidden capability value to the season character.

The item information storing unit 420 stores the information for the limitation capability value adjustment item when the online game provides the limitation capability value adjustment item and allows the some character among the character stored in the character information storing unit 411 to have the limitation capability value adjustment item. Further, the cyber money management unit 430 subtracts the cyber money or the game point of the user or the character managed by the user by corresponding to goods to be purchased when the user wishes to purchase the general character and the special character stored in the character information storing unit 411, the season character stored in the season character pool storing unit 412, or the character managed by the user to purchase the item stored in the item information storing unit 420. In contrast, when conversely requiring the sale, the cyber money or the game point corresponding to the sale goods is converted to the user possession.

The information storing unit 410 and the item information storing unit 420 may both store the character information and the item information, or may divide and provide the game server and the information.

Also, the character providing apparatus 400 is shown as a separate apparatus in FIG. 9, however it may be configured to be included in the game server, or may be realized as a database if necessary.

The method for providing the character of the online game and the apparatus thereof in accordance with the exemplary embodiments of the present invention as described above may be executed by the applications basically installed in the terminal (including programs included in a platform, an operating system, or the like which are basically installed in the terminal), and may also be executed by the applications (i.e., programs) which are directly installed in the terminal by the user via an application store server or an application store server such as a web server associated with the applications or the corresponding services. In this respect, the method for providing the character of the online game in accordance with the exemplary embodiments of the present invention may be implemented by the applications (i.e., programs) which are basically installed or directly installed by the user in the terminal, and may be recorded in a computer readable recording medium of the terminal and the like.

The programs are recorded in the computer readable recording medium and are executed by the computer, such that the above-mentioned functions may be executed.

As described above, in order for the computer to read the programs recorded in the recording medium and execute the method for providing the character of the online game in accordance with the exemplary embodiments of the present invention, the above-mentioned programs may include codes which are coded with computer languages such as C, C++, JAVA, machine language, and the like which may be read by a processor (CPU) of the computer.

The code may include a function code associated with a function of defining the above-mentioned functions, and may also include an execution procedure related control code required for the processor of the computer to execute the above-mentioned functions according to a predetermined procedure.

Further, the code may include a memory reference related code indicating at which location (address number) of the memory inside or outside the computer additional information or media required for the processor of the computer to execute the above-mentioned functions needs to be referenced.

Further, in order for the processor of the computer to execute the above-mentioned functions, when the processor needs to communicate with any other computers or servers, etc. at a remote location, the code may further include a communication related code about how the processor of the computer communicates with any other computers or servers at a remote location or which information or media the processor of the computer transmits and receives at the time of the communication, by using the communication module (for example, a wired and/or wireless communication module) of the computer.

Further, a functional program for implementing the present invention, a code and a code segment associated therewith, and the like may be easily inferred or changed by programmers in the art to which the present invention pertains in consideration of a system environment of the computer which reads the recording medium and executes the program.

Hereinabove, examples of a computer readable recording medium recorded with programs as described above include a ROM, a RAM, a CD-ROM, a magnetic tape, a floppy disk, an optical media storage device, and the like.

Further, a computer readable recording medium recorded with programs as described above may be distributed to a computer system connected through a network and thus store and execute a computer readable code by a distributed manner. In this case, at least one computer among a plurality of distributed computers may execute a part of the above-mentioned functions and transmit the executed results to at least one of the other distributed computers, and the computer receiving the result may also execute a part of the above-mentioned functions and provide the executed results to the other distributed computers.

In particular, a computer readable recording medium recorded with applications, which are programs for executing the method for providing the character of the online game in accordance with the exemplary embodiments of the present invention, may be a storage medium (for example, a hard disk and the like) included in an application store server or an application providing server such as a web server associated with applications or corresponding services, and the like, or the application providing server itself.

A computer, which may read a recording medium recorded with applications that are programs for executing the method for providing the character of the online game in accordance with the exemplary embodiments of the present invention, may include not only a general PC such as a typical desktop and a laptop, but also a mobile terminal such as a smart phone, a tablet PC, a personal digital assistant (PDA), and a mobile communication terminal, and is to be construed as all the computable devices.

When a computer, which may read a recording medium recorded with applications that are programs for executing the method for providing the character of the online game in accordance with the exemplary embodiments of the present invention, is a mobile terminal such as a smart phone, a tablet PC, a personal digital assistant (PDA), and a mobile communication terminal, the applications are downloaded from an application providing server to a general PC and thus may also be installed in the mobile terminal through a synchronization program.

Hereinabove, although it has been mentioned that all components configuring the exemplary embodiment of the present invention described hereinabove are combined with each other as one component or are combined and operated with each other as one component, the present invention is not necessarily limited to the above-mentioned exemplary embodiment. That is, all the components may also be selectively combined and operated with each other as one or more component without departing from the scope of the present invention. In addition, although each of all the components may be implemented by one piece of independent hardware, some or all of the respective components which are selectively combined with each other may be implemented by a computer program having a program module performing some or all of functions combined with each other in one or multiple pieces of hardware. The codes and the code segments configuring the computer program may be easily inferred by a person having ordinary skill in the art to which the present invention pertains. The computer programs are stored in the computer readable media and are read and executed by the computer, and may implement the exemplary embodiment of the present invention. As the storage medium of the computer programs, a magnetic recording medium, an optical recording medium, and the like may be used.

Further, it will be further understood that the terms "comprises" or "have" used in this specification may include the corresponding components unless explicitly described to the contrary and therefore, do not preclude other components and may further include the components. In addition, unless defined otherwise in the detailed description, all the terms including technical and scientific terms have the same meaning as those generally understood by those skilled in the art to which the present invention pertains. Generally used terms such as terms defined in a dictionary should be interpreted as having the same meanings as those within a context of the related art and should not be interpreted as ideally or excessively formal meanings unless clearly defined in the present specification.

The spirit of the present invention has just been exemplified. It will be appreciated by those skilled in the art that various modifications and alterations can be made without departing from the essential characteristics of the present invention. Accordingly, the exemplary embodiments disclosed in the present invention do not limit but describe the spirit of the present invention, and the scope of the present invention is not limited by the exemplary embodiments. The scope of the present invention should be interpreted by the following claims, and it should be interpreted that all spirits equivalent to the following claims fall within the scope of the present invention.

The invention claimed is:

1. A computer-implemented method for providing a character of an online game, comprising:
   obtaining information for at least one season character selected from among a plurality of general characters pre-provided in a game, wherein the information comprises at least one skill capability value and a limitation capability value as an upper limit value of the at least one skill capability value according to a generated time of the at least one season character;
   setting a skill capability value adjustment rule to adjust the at least one skill capability value for the at least one season character;
   adjusting the at least one skill capability value of the at least one season character to be higher than a skill capability value of a general character corresponding to the at least one season character according to the skill capability value adjustment rule;
   setting a limitation capability value adjustment margin;
   setting a limitation capability value adjustment reference according to the limitation capability value adjustment margin;
   setting the limitation capability value of the at least one season character according to the limitation capability value adjustment reference; and
   providing, by a processor, the at least one season character in the game according to the adjusted at least one skill capability value and the set limitation capability value.

2. The method of claim 1, wherein,
   in the obtaining of the information for the at least one season character,
   information for the general character corresponding to the at least one season character is obtained.

3. The method of claim 1, wherein
   the setting of the skill capability value adjustment rule includes: setting at least one skill capability value adjustment rule; and
   setting a plurality of skill capability value adjustment rule application
   methods when the skill capability value adjustment rule is plural.

4. The method of claim 3, wherein
   the setting of the at least one skill capability value adjustment rule includes:
   multiplying a predetermined correction ratio by a difference value between the skill capability value of the general character and a predetermined upper limit value of skill capability values, and setting a value of which the difference value multiplied by the predetermined correction ratio is subtracted from the predetermined upper limit value as a first skill capability value;
   setting a value of which a predetermined up-ratio is multiplied by the skill capability value of the general character as a second skill capability value; and
   setting any one of the first skill capability value and the second skill capability value as the at least one skill capability value of the at least one season character as the skill capability value adjustment rule.

5. The method of claim 4, wherein
   the setting of the plurality of skill capability value adjustment rule application methods includes:
   setting the first skill capability value as the at least one skill capability value of the at least one season character when the first skill capability value is less than the second skill capability value; and
   setting the second skill capability value as the at least one skill capability value of the season character when the first skill capability value is greater than or equal to the second skill capability value.

6. The method of claim 1, wherein
   the adjusting of the at least one skill capability includes:
   analyzing each skill capability value for a plurality of skills of the at least one season character; and
   adjusting the analyzed skill capability values according to the skill capability value adjustment rule.

7. The method of claim 1, wherein
   the setting of the limitation capability value adjustment margin includes:
   determining whether a special character having a limitation capability value that is higher than a limitation capability value of a general character is provided in the game;
   setting the limitation capability value adjustment margin between the limitation capability value of the general character and a limitation capability value predetermined to be higher than the limitation capability value of the general character if the special character is not provided; and setting the limitation capability value adjustment margin between the limitation capability value of the general character and the limitation capability value of the special character if the special character is provided.

8. The method of claim 1, wherein the setting of the limitation capability value adjustment margin includes:

determining whether a limitation capability value adjustment item increasing a predetermined limitation capability value of the plurality of general characters by a predetermined capability value is provided in the game;

setting the limitation capability value adjustment margin between the predetermined limitation capability value of the plurality of general characters and a limitation capability value predetermined to be higher than the predetermined limitation capability value of plurality of the general characters if the limitation capability value adjustment item is not provided; and setting the limitation capability value adjustment margin between the predetermined limitation capability value of the plurality of general characters applied with the limitation capability value adjustment item and the limitation capability value predetermined to be higher than the predetermined limitation capability value of the plurality of general characters if the limitation capability value adjustment item is provided.

9. The method of claim 1, wherein the setting of the limitation capability value adjustment reference includes:

dividing the at least one skill capability value of the at least one season character by a section interval of a predetermined skill capability value; and setting a different limitation capability value for the divided section interval of the predetermined skill capability value.

10. The method of claim 9, wherein the setting of the limitation capability value of the at least one season character includes:

analyzing the adjusted at least one skill capability value of the at least one season character; and setting the limitation capability value of the at least one season character by applying the analyzed at least one skill capability value of the at least one season character to the limitation capability value adjustment reference.

11. The method of claim 1, further comprising, after the setting of the limitation capability value of the at least one season character, adding a hidden capability value to the at least one skill capability value of the at least one season character, wherein, after the adding, the at least one skill capability value of the at least one season character is displayed to a user and a sum of the hidden capability value and the at least one skill capability value of the at least one season character is an actual skill capability value of the at least one season character used in the game.

12. An apparatus for providing a character of an online game character, comprising:

a processor; and a computer readable recording medium storing computer readable code that, when executed by the processor, cause the processor to:

obtain information for at least one season character selected from among a plurality of general characters pre-provided in a game, wherein the information comprises at least one skill capability value and a limitation capability value as an upper limit value of the at least one skill capability value according to a generated time of the at least one seasons characters;

set a skill capability value adjustment rule to adjust the at least one skill capability value for the at least one season character; and adjust the at least one skill capability value of the at least one season character to be higher than a skill capability value of a general character corresponding to the at least one season character according to the skill capability value adjustment rule;

set a limitation capability value adjustment margin;

set a limitation capability value adjustment reference according to the limitation capability value adjustment margin;

set the limitation capability value of the at least one season character according to the limitation capability adjustment reference; and provide the at least one season character in the game according to the adjusted at least one skill capability value and the set limitation capability value.

13. The apparatus of claim 12, wherein the computer readable medium further comprises instructions that, when executed by the processor, case the processor to:

set the limitation capability value adjustment margin to be between a limitation capability value of the plurality of general characters applied with a limitation capability value adjustment item and a limitation capability value predetermined to be higher than the limitation capability value of the plurality of general characters if the limitation capability value adjustment item is provided in the game, wherein the limitation capability value adjustment item increases the limitation capability value of the plurality of general characters by a predetermined capability value.

14. The apparatus of claim 12, wherein the computer readable medium further comprises instructions that, when executed by the processor, cause the processor to:

set the limitation capability value adjustment margin to be between a limitation capability value of the plurality of general characters and a limitation capability value of a special character if the special character is provided in the game, wherein the limitation capability value of the special character is higher than the limitation capability value of the plurality of general characters.

15. A non-transitory computer readable recording medium storying computer readable code for providing a character of an online game, that, when executed by a processor, case the processor to:

obtain information for at least one season character selected among a plurality of general characters pre-provided in a game, wherein the information comprises at least one skill capability value and according to a season character selection reference and differentiated a limitation capability value as an upper limit value of the at least one skill capability value according to a generated time of the at least one season character;

set a skill capability value adjustment rule to adjust the at least one skill capability value for the at least one season character;

adjust the at least one skill capability value of the at least one season character to be higher than a skill capability value of a general character corresponding to the at least one season character according to the skill capability value adjustment rule;

set a limitation capability value adjustment margin;

set a limitation capability value adjustment reference according to the limitation capability adjustment margin;

set the limitation capability value of the at least one season character according to the limitation capability value adjustment reference; and provide the at least one season character in the game according to the adjusted at least one skill capability value and the set limitation capability value.

\* \* \* \* \*